United States Patent
Gilbert et al.

(10) Patent No.: US 11,884,841 B2
(45) Date of Patent: Jan. 30, 2024

(54) ANTIMICROBIAL PAINT COMPOSITION AND RELATED METHODS

(71) Applicant: BEHR PROCESS CORPORATION, Santa Ana, CA (US)

(72) Inventors: John A. Gilbert, Orange, CA (US); Greg J. Sarnecki, Irvine, CA (US); Bill R. Schwingel, Saline, MI (US)

(73) Assignee: BEHR PROCESS CORPORATION, Santa Ana, CA (US)

( * ) Notice: Subject to any disclaimer, the term of this patent is extended or adjusted under 35 U.S.C. 154(b) by 1379 days.

(21) Appl. No.: 16/318,938

(22) PCT Filed: Jul. 18, 2017

(86) PCT No.: PCT/US2017/042562
§ 371 (c)(1),
(2) Date: Jan. 18, 2019

(87) PCT Pub. No.: WO2018/017557
PCT Pub. Date: Jan. 25, 2018

(65) Prior Publication Data
US 2019/0264040 A1    Aug. 29, 2019

Related U.S. Application Data

(60) Provisional application No. 62/363,922, filed on Jul. 19, 2016.

(51) Int. Cl.
| | |
|---|---|
| C09D 5/14 | (2006.01) |
| C09D 7/40 | (2018.01) |
| C09D 5/00 | (2006.01) |
| C08K 3/40 | (2006.01) |
| C08K 5/378 | (2006.01) |
| C08K 3/08 | (2006.01) |
| C08K 5/00 | (2006.01) |

(52) U.S. Cl.
CPC ............. C09D 5/14 (2013.01); C09D 5/00 (2013.01); C09D 7/40 (2018.01); C09D 7/67 (2018.01); C09D 7/69 (2018.01); C08K 3/40 (2013.01); C08K 5/0008 (2013.01); C08K 5/0058 (2013.01); C08K 5/378 (2013.01); C08K 2003/085 (2013.01); C08K 2201/005 (2013.01); C08K 2201/011 (2013.01)

(58) Field of Classification Search
None
See application file for complete search history.

(56) References Cited

U.S. PATENT DOCUMENTS

| | | | |
|---|---|---|---|
| 5,057,153 A | 10/1991 | Ruggiero | |
| 5,098,473 A | 3/1992 | Hani | |
| 5,185,033 A | 2/1993 | Hani | |
| 5,232,493 A | 8/1993 | Waldron | |
| 5,238,490 A | 8/1993 | Farmer | |
| 5,562,995 A | 10/1996 | Kappock | |
| 8,563,020 B2 | 10/2013 | Uhlmann et al. | |
| 9,028,962 B2 | 5/2015 | Borrelli et al. | |
| 9,439,439 B2 | 9/2016 | Borrelli et al. | |
| 2003/0096545 A1 | 5/2003 | Pain | |
| 2010/0323211 A1* | 12/2010 | Yukawa | C09D 167/02 427/407.1 |
| 2014/0079807 A1 | 3/2014 | Borrelli et al. | |
| 2014/0134126 A1 | 5/2014 | Phukan | |
| 2014/0212467 A1 | 7/2014 | Chen et al. | |
| 2014/0296371 A1 | 10/2014 | Kappock | |
| 2014/0308265 A1 | 10/2014 | Sookram et al. | |
| 2015/0225572 A1 | 8/2015 | Jiang et al. | |
| 2015/0230476 A1 | 8/2015 | Bookbinder et al. | |

FOREIGN PATENT DOCUMENTS

| | | | | |
|---|---|---|---|---|
| CN | 104202973 A | | 12/2014 | |
| EP | 2604661 A1 | | 6/2013 | |
| EP | 3000857 A1 | | 3/2016 | |
| JP | 2006188453 A | | 7/2006 | |
| JP | 2009173914 A | * | 8/2009 | |
| JP | 2009173914 A | | 8/2009 | |
| JP | 4601739 B2 | | 12/2010 | |
| JP | 2011140558 A | * | 7/2011 | |
| JP | 4812895 B1 | | 11/2011 | |
| JP | 2012102233 A | * | 5/2012 | ............. A01K 75/00 |
| WO | WO-03018494 A2 | * | 3/2003 | ............. A01N 25/08 |

(Continued)

OTHER PUBLICATIONS

Blaessinger et al., WO-03018494-A2, Mar. 6, 2003 (machine translation) (Year: 2003).*
Takezawa, JP-2012102233-A, May 2012 (machine translation) (Year: 2012).*
Kaneko, JP-2011140558-A, Jul. 2011 (machine translation) (Year: 2011).*
Otawa, JP-2009173914-A, Aug. 2009 (machine translation) (Year: 2009).*
International Search Report and Written Opinion for PCT/US2017/042562, dated Oct. 12, 2017, 5 pages.
Machine English Translation of the abstract, claims, and description of JP2006188453, dated Jan. 11, 2019, 33 pages.
Machine English Translation of the abstract, claims, and description of JP2009173914, dated Jan. 11, 2019, 36 pages.

(Continued)

*Primary Examiner* — Cheng Yuan Huang
(74) *Attorney, Agent, or Firm* — WARNER NORCROSS + JUDD LLP

(57) ABSTRACT

An antimicrobial paint composition for forming an antimicrobial coating is disclosed. The antimicrobial paint composition comprises a carrier vehicle, a film-forming polymer, a glass comprising copper, and a non-copper pyrithione salt. A method of preparing the antimicrobial coating on an indoor surface with the antimicrobial paint composition is further disclosed. The method comprises applying the antimicrobial paint composition on the indoor surface and forming the antimicrobial coating on the indoor surface from the antimicrobial paint composition.

18 Claims, No Drawings

(56) References Cited

FOREIGN PATENT DOCUMENTS

WO       2015198338 A1    12/2015
WO       2016028554 A1    2/2016

OTHER PUBLICATIONS

Machine English Translation of the abstract, claims, and description of JP4601739 dated Mar. 6, 2019, 10 pages.
Machine English Translation of the abstract, claims, and description of JP4812895 dated Mar. 6, 2019, 22 pages.

* cited by examiner

ANTIMICROBIAL PAINT COMPOSITION AND RELATED METHODS

CROSS-REFERENCE TO RELATED APPLICATIONS

This application is a national phase entry of PCT/US2017/042562, filed Jul. 18, 2017, which claims priority to U.S. Provisional Patent Application No. 62/363,922, filed Jul. 19, 2016, both of which are incorporated herein by reference in their entirety.

FIELD OF THE INVENTION

The present invention generally relates to a paint composition and, more specifically, to an antimicrobial paint composition, a method of preparing the antimicrobial paint composition, and a method of preparing an antimicrobial coating therewith.

DESCRIPTION OF THE RELATED ART

Paint compositions, such as latex paint compositions, generally exist as a liquid emulsion, where small droplets of polymer are mixed into a carrier vehicle, along with pigments and other excipients. Such paint compositions are typically disposed onto a surface to form a solid film coating, e.g. a paint, for aesthetic and functional purposes such as decoration, surface protection, insulation, passivation, and the like.

Conventional paint compositions typically contain four classes of components: a carrier vehicle, binder, pigment, and additives.

The carrier vehicle is a fluid component of the paint composition which serves to carry, dissolve, or solubilize all of the other components. The carrier vehicle typically flashes or evaporates as the paint composition forms the solid film coating and dries on a surface. In latex paints, the carrier vehicle is usually water. In oil-based paints, the carrier vehicle is usually an organic solvent.

The binder is a film-forming component of the paint composition, which causes the paint composition to form the solid film coating on and adhere to a surface. The binder is typically a film-forming polymer. In a latex paint composition, the binder comprises a latex resin, usually selected from acrylics, vinyl acrylics, or styrene acrylics. Such latex resins are typically included in the latex paint composition as particles, which are typically dispersed in the carrier vehicle.

Pigments impart the paint composition and the coating formed therewith with both decorative and protective features. Pigments are solid particles used to provide the paint composition, and coatings formed therewith, with various physical and aesthetic qualities, such as color, opacity, and durability.

A multitude of additives may also be included in paint compositions. The additives are typically used at relatively low levels in the paint formulation, but contribute to various properties of paints, including rheology, stability, paint performance, and application quality.

Consumers typically expect an aesthetic look of painted surfaces to be desirable and to have longevity; however, fungal and algal growth often stains paint, causes odor, and deteriorates the paint's properties. Accordingly, biocides are sometimes added to paint compositions to maintain the integrity, and to provide protection in the coating against fungal and algal growth. As such, biocides for coating protection play a large role in maintaining paint's physical aesthetic and minimize microbial growth. However, most common commercial solid film biocides are based on actives that are effective against only fungi, such as molds and yeasts, and sometimes algae. Additionally, common commercial biocides impart color to paints when used at effective concentrations, which significantly limits the color palette available to formulators and significantly limits consumer aesthetics. Similarly, common metal-based solid film biocides may also contribute to paint discoloration when exposed to light.

SUMMARY OF THE INVENTION

Disclosed is an antimicrobial paint composition for forming an antimicrobial coating. The antimicrobial paint composition comprises a carrier vehicle, a film-forming polymer, a glass comprising copper, and a non-copper pyrithione salt. The copper and the non-copper pyrithione salt interact to form copper pyrithione in the antimicrobial paint composition and/or the antimicrobial coating formed thereby.

A method of preparing the antimicrobial paint composition is also disclosed. The method comprises combining the carrier vehicle, the film-forming polymer, the glass comprising copper, and the non-copper pyrithione salt to give the antimicrobial paint composition.

A method of preparing the antimicrobial coating on an indoor surface with the antimicrobial paint composition is further disclosed. The method comprises applying the antimicrobial paint composition on the indoor surface and forming the antimicrobial coating on the indoor surface from the antimicrobial paint composition.

DETAILED DESCRIPTION OF THE INVENTION

An antimicrobial paint composition for forming an antimicrobial coating, a method of preparing the antimicrobial paint composition, and a method of preparing the antimicrobial coating from the antimicrobial paint composition are disclosed and described in greater detail below. The antimicrobial paint composition and methods are well suited for applications in medical facilities such as hospitals and clinics, care facilities such as nurseries and assisted living homes, public buildings, laboratories, schools, and vehicles. However, not so limited to the applications above, the antimicrobial paint composition and methods herein can be used in other end use applications, including residential applications.

As used herein, the term "antimicrobial" means an agent or material, or a surface containing the agent or material, which will kill or inhibit the growth of at least one type of microbe. Examples of microbes include bacteria, viruses, and fungi. The term as used herein is not intended to mean it will kill or inhibit the growth of all species microbes within all such families, but that it will kill or inhibit the growth or one or more species of microbes from such families. When an agent or material is described as being "antibacterial, "antiviral" or "antifungal," it means that the agent or material will kill or inhibit the growth of bacteria, viruses, or fungi, respectively.

Carrier Vehicle

The antimicrobial paint composition comprises a carrier vehicle. Any suitable carrier vehicle can be used, such as a solvent, a liquid polymer or wax, or combinations thereof. The carrier vehicle may be aqueous, organic, or combinations thereof. The carrier vehicle disperses and may solubilize, partially solubilize, or dissolve the other components of the antimicrobial paint composition.

In some embodiments, the antimicrobial paint composition comprises an aqueous carrier vehicle. In general, water is the predominant component of the aqueous carrier vehicle, although solvents that are miscible with water can be used as co-solvents and be mixed with the water in the aqueous carrier vehicle. Examples of suitable co-solvents include ethers, esters, alcohols, glycols, aromatics, and the like. Specific examples of suitable co-solvents also include ethylene glycol or a derivative thereof, such as ethylene glycol monoethyl ether, ethylene glycol monobutyl ether, diethylene glycol monobutyl ether, or ethylene glycol monohexyl ether; propylene glycol or a derivative thereof, such as propylene glycol monomethyl ether, propylene glycol monoethyl ether, or propylene glycol monobutyl ether; or combinations thereof. In some embodiments, the aqueous carrier vehicle consists essentially of, alternatively consists of, water. In certain embodiments, the aqueous carrier vehicle comprises water in an amount of at least 50, 60, 70, 80, 90, 95, 97, 98, or 99, weight percent based on the total weight of the aqueous carrier vehicle. In certain embodiments the aqueous carrier may be referred to merely as water. The water may be from any source and may optionally be purified.

Alternatively, such co-solvents may be utilized, alone or together with other organic solvents, as the carrier vehicle of the antimicrobial paint composition, in which case the carrier vehicle is nonaqueous. However, the carrier vehicle is typically aqueous.

The carrier vehicle can be present in the antimicrobial paint composition in any effective amount, e.g. for creating a solution or emulsion when mixed with the other components of the antimicrobial paint composition. In some embodiments, the antimicrobial paint composition comprises the carrier vehicle in an amount of from about 30 to about 80, alternatively from about 35 to about 75, alternatively from about 40 to about 80, weight percent based on the total weight of the antimicrobial paint composition. In other embodiments, the antimicrobial paint composition comprises the carrier vehicle in an amount of 20, 25, 30, 35, 40, 45, 50, 55, 60, 65, 70, or 80, weight percent based on the total weight of the antimicrobial paint composition. It is to be appreciated that these ranges and amounts may apply to the antimicrobial paint composition as a whole, and thus may encompass any or all amounts of the carrier vehicle present in any one or more component of the antimicrobial paint composition, such as those components described below.

In some embodiments, it may be desirable to adjust the pH of the carrier vehicle, depending, for example, on whether one or more components in the antimicrobial paint composition may perform better for certain end uses based on the pH of the carrier vehicle. Adjusting the pH of the carrier vehicle will also influence the pH of the antimicrobial paint composition itself. In certain embodiments, the carrier vehicle is approximately neutral, meaning that it has a pH of from about 6 to about 8, such as 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or 8. In some other embodiments, the carrier vehicle is an acidic medium, such as a medium having a pH less than 7. In some such embodiments, the pH is in the range of from about 3 to about 7 (but not including 7), about 4 to about 7, or about 5 to about 7. In further embodiments, the carrier vehicle is an alkaline medium, such as a medium having a pH greater than 7. In some such embodiments, the pH is in the range of from about 7 (but not including 7) to about 11, about 7 to about 10, or about 7 to about 9. In certain embodiments, the pH of the carrier vehicle is selected such that the antimicrobial paint composition itself has a pH that is, or is in the range of, one of the values described above with respect to the carrier vehicle. In certain embodiments, the pH of the carrier vehicle and/or the antimicrobial paint composition is adjusted using a pH modifier, such as sodium hydroxide Film-Forming Polymer The antimicrobial paint composition also comprises a film-forming polymer. The film-forming polymer is typically a resin, such as a thermoset, a thermoplastic, or a combination thereof. However, any suitable firm-forming polymer can be used. Moreover, the film-forming polymer may be a single film-forming polymer, or a combination of similar and/or different film-forming polymers. The film-forming polymer may be natural or synthetic; reactive or nonreactive; crosslinked or uncrosslinked; organic or inorganic; linear, branched, resinous, polymeric, oligomeric, or a combination thereof; hydrophilic or hydrophobic; lipophilic or lipophobic; charged or uncharged; polar or nonpolar; and combinations thereof. Film-forming polymers that are dispersible in the carrier vehicle are generally preferred.

In specific embodiments, the film-forming polymer is selected from the group of acrylics, polyurethanes, silicones, acrylates, solution polymers, and combinations thereof. In certain embodiments, the film-forming polymer is selected such that the antimicrobial paint composition is a polyurethane dispersion, a silicone emulsion, a styrene acrylate dispersion, a urethane-acrylic hybrid dispersion, an aliphatic polyurethane dispersion, an acrylic dispersion, or combinations thereof.

In some embodiments, the film-forming polymer is a natural latex. In certain embodiments, the film-forming polymer is a synthetic latex. Such synthetic latexes include, but are not limited to, acrylic polymers, polyvinyl acetate, polyvinyl chloride, styrene-butadiene rubber, other styrene polymers, acrylonitrile-butadiene rubber, epoxy resins, and combinations thereof. In some embodiments, the firm-forming polymer is a mixture of a natural latex and one or more synthetic latex compositions. Certain firm-forming polymers suitable for use in antimicrobial paint and coating applications are available commercially. A non-limiting example is RHOPLEX SG-30 acrylic resin (commercially available from Dow Chemical Co. of Midland, MI). In some embodiments, the antimicrobial paint composition includes more than one film-forming polymer.

In some embodiments, the film-forming polymer is a water-dispersible polymer and maybe present in the antimicrobial paint composition as a separate phase, which, for example, may be dispersed in the carrier vehicle. In such embodiments, the carrier vehicle is typically an aqueous carrier vehicle, such as those described above. In some embodiments, the film-forming polymer can form a plurality of liquid or solid droplets in the antimicrobial paint composition, which may be dispersed in the carrier vehicle. In some such embodiments, the liquid or solid droplets are dispersed in the carrier vehicle in a manner so as to form an emulsion. For example, the film-forming polymer may exist as a discontinuous phase, with the carrier vehicle existing as a continuous phase. In some instances, however, the antimicrobial paint composition may tend to phase-separate into distinct layers, such as instances where the antimicrobial paint composition is left to sit for some length of time. Such phase-separated (or partially phase-separated) compositions are also within the scope of the disclosed antimicrobial paint compositions. In some embodiments, a small amount of the film-forming polymer may be dissolved in or by the carrier vehicle, although, in most embodiments, a predominant amount (e.g. at least 80, 90, 95, 97, or 99, weight percent based on the total weight of the film-forming polymer), of the firm-forming polymer is not dissolved in or by the aqueous carrier vehicle.

Any suitable amount of the film-forming polymer can be used in the antimicrobial paint composition. The amount can vary depending on a variety of factors, including, but not limited to, the desired rheology of the antimicrobial paint composition, the desired end use of the antimicrobial paint composition, the properties of the film-forming polymer, the identity of other components (e.g. the carrier vehicle) in the antimicrobial paint composition, end uses of the antimicrobial coating formed therefrom, and the like. The amount of film-forming polymer employed in the antimicrobial paint composition is typically between about 20 to about 60, alternatively from about 25 to about 55, alternatively from about 30 to about 50, alternatively from about 30 to about 45, alternatively from about 35 to about 55, weight percent based on the total weight of the antimicrobial paint composition before drying.

In some embodiments, the antimicrobial paint composition comprises a weight-to-weight ratio of the film-forming polymer to the carrier vehicle in a range of from 1:2 to 10:1, from 1:1 to 8:1, from 2:1 to 6:1, or from 3:1 to 5:1. In embodiments where a co-solvent is present in the carrier vehicle, the foregoing ratios also apply, i.e., this ratio is not exclusively relative to the main component of the carrier vehicle (e.g. water), but may be relative to the entire weight of the carrier vehicle and components therein.

In some embodiments, the film-forming polymer is particulate. In certain embodiments the film-forming polymer has an average particle size of from about 80 to about 160, alternatively from about 90 to about 150, alternatively from about 85 to about 100, nanometers. The film-forming polymer may comprise substantially homogenously sized particles. By "substantially homogenously sized particles," it is meant that at least 80, 90, 95, 97, or 99, weight percent based on the total weight of the particles are about the same, substantially the same, or the same size, e.g. have a size that is within 30, alternatively within 25, alternatively within 20, volume percent deviations of one another. In other embodiments, the film-forming polymer comprises particles of different sizes or shapes. In certain embodiments, the film-forming polymer is a powder.

Glass Comprising Copper

The antimicrobial paint composition further comprises a glass comprising copper, which may be referred to herein merely as "copper glass." The copper glass serves primarily as a matrix which leaches the copper in the antimicrobial paint composition, antimicrobial coating formed therefrom, or both. Accordingly, the type of glass is not limited and any glass suitable for use with copper may be used. Some examples of suitable glasses for use in the antimicrobial paint composition may include those described in PCT publication nos. WO2015126806 and WO2012135194, and U.S. patent application no. US2014/0017462, which are each herein incorporated by reference. The copper glass may be a conventional glass comprising copper, or may be a specific type of glass, e.g. a borosilicate glass, comprising copper.

In some embodiments, the copper glass comprises oxides selected from $SiO_2$, $Al_2O_3$, CaO, MgO, $P_2O_5$, $B_2O_3$, $K_2O$, ZnO, $Fe_2O_3$, or combinations thereof. For example, the copper glass may comprise, in mole percent: $SiO_2$ in the range from about 40 to about 70, $Al_2O_3$ in the range from about 0 to about 20, CaO in the range from about 0 to about 15, MgO in the range from about 0 to about 15, $P_2O_5$ in the range from about 0 to about 25, $B_2O_3$ in the range from about 0 to about 25, $K_2O$ in the range from about 0 to about 20, ZnO in the range from about 0 to about 5, and $Fe_2O_3$ in the range from about 0 to about 5. In certain embodiments the antimicrobial paint composition may be free of $Al_{20}O_3$. In some embodiments the copper glass is a silicate glass.

The copper glass may be present in the antimicrobial paint composition in any amount, such as from greater than 0 to about 10, alternatively from about 0.1 to about 8, alternatively from about 0.15 to about 6, alternatively from about 0.16 to about 5, alternatively from about 0.17 to about 4, alternatively from about 0.18 to about 3, alternatively from about 0.19 to about 2.5, alternatively from about 0.19 to about 2, alternatively from about 0.2 to about 2, alternatively from about 0.19 to about 1.9 weight percent based on the total weight of the antimicrobial paint composition. In some embodiments, the antimicrobial paint composition comprises 0.1, 0.2, 0.3, 0.4, 0.5, 0.6, 0.7, 0.8, 0.9, 1.0, 1.25, 1.5, 1.75, or 2.0 weight percent of the copper glass based on the total weight of the antimicrobial paint composition.

The copper glass may be present in the antimicrobial paint composition in any form, such as particles, fibers, and the like, and combinations of different forms. In certain embodiments the copper glass is present in the antimicrobial paint composition in the form of particles. Examples of suitable copper glass particles include those having an average diameter in a range of from about 0.05 to about 20, alternatively from about 0.1 to about 15, alternatively from about 0.15 to about 15, alternatively from about 0.2 to about 12, micrometers, such as from about 0.1 to about 12, from about 0.15 to about 11, from about 0.2 to about 10.5, from about 0.3 to about 10, micrometers, and all ranges and sub-ranges therebetween.

The size of the particles of the copper glass may be selected to influence or control properties of the antimicrobial paint composition and/or the antimicrobial coating formed therefrom. For example, well dispersed finer particles in liquids or solids (including coatings) result in a more uniform distribution of the particles in the bulk material and on a coated surface. Additionally, the size of the copper glass particles may be selected to increase or decrease the surface area of the particles available to interact with the microbes in the antimicrobial paint composition or coatings formed therefrom, which may impact leaching and surface area to volume ratios associated with antimicrobial properties. Similarly, the antimicrobial paint composition may comprise copper glass particles having a plurality of different sizes of particles. For instance, the antimicrobial paint composition may comprise a mixture of copper glass particles having one, two, three, or more average particle sizes. Additionally, the copper glass particles may be substantially spherical or may have an irregular shape. In some embodiments, individual copper glass particles may have independently selected dimensions and shapes. As such, the average diameters described above may describe a particular copper glass particle present in the antimicrobial paint composition, or may describe a combination of all copper glass particles present in the antimicrobial paint composition.

In some embodiments the copper glass is porous. The porosity (i.e., the number of pores in the copper glass) and the size of the pores may be selected to increase or decrease the surface area of the copper glass available to interact with the microbes in the antimicrobial paint composition or coatings formed therefrom. Additionally, copper emission, i.e., the rate of release of copper from the copper glass, can be tailored by varying the porosity, geometry, and/or size of the pores, as well as the size, shape, and form (e.g. particle, fiber) of the copper glass itself. In general, smaller particle sizes, elongated or irregular particle shapes vs spherical particle shapes given the same particle volume, higher porosity, and larger pore sizes will result in increased rates of copper emission/release. In certain embodiments different sized particles, and also particles with different pore sizes, can be mixed to tailor release properties to suit both short term and long term emission/release of copper in the antimicrobial paint composition and/or the antimicrobial coating formed therefrom.

The copper glass may comprise multiples phases, such as at least a first phase and a second phase. In some embodiments, the copper glass includes two or more phases wherein the phases differ based on the ability of the atomic bonds in a given phase to withstand interaction with a leachate. Specifically, the copper glass of one or more embodiments may include a first phase that may be described as a degradable phase and a second phase that may be described as a durable phase. The phrases "first phase" and "degradable phase" may be used interchangeably. The phrases "second phase" and "durable phase" may be used interchangeably. As used herein, the term "durable" refers to the tendency of the atomic bonds of the durable phase to remain intact during and after interaction with a leachate. As used herein, the term "degradable" refers to the tendency of the atomic bonds of the degradable phase to break during and after interaction with one or more leachates. In one or more embodiments, the durable phase includes $SiO_2$ and the degradable phase includes at least one of $B_2O_3$, $P_2O_5$, and $R_2$, where R can include any one or more of K, Na, Li, Rb, and Cs. Without being bound by theory, it is believed that the components of the degradable phase (i.e., $B_2O_3$, $P_2O_5$ and/or $R_2O$) more readily interact with a leachate, and the bonds between these components to one another and to other components in the copper glass more readily break during and after the interaction with the leachate. Leachates may include water, solvents, acids, and other similar materials. In one or more embodiments, the degradable phase withstands degradation for 1 week or longer, 1 month or longer, 3 months or longer, or even 6 months or longer.

In one or more embodiments, the durable phase is present in the copper glass in an amount by weight that is greater than the amount of the degradable phase in the copper glass.

The copper may be present or entrapped in the copper glass in any oxidation state, including $Cu^{1+}$, $Cu^{o}$, $Cu^{2+}$, and combinations thereof. In some embodiments, the copper is present or entrapped in a network or matrix of the copper glass. Where the copper is present or entrapped in the copper glass network or matrix, the copper may also or alternatively be atomically bonded to the atoms in the copper glass network or matrix. Where the copper is present or entrapped in the copper glass network or matrix, the copper may be present in the form of copper crystals that are dispersed in the copper glass network or matrix. In certain embodiments the copper crystals include cuprite ($Cu_2O$). The cuprite present in the copper glass may form a phase that is distinct from the copper glass matrix or glass phase, or may form part of, or be associated with, one or more glass phases. In embodiments where copper crystals are present in the copper glass, the material may be referred to as a glass ceramic, which is intended to refer to a specific type of glass with crystals that may or may not be subjected to a traditional ceramming process by which one or more crystalline phases are introduced and/or generated in the copper glass. Where the copper is present in a non-crystalline form, the material may be referred to as a glass. In some embodiments, copper crystals are present in the copper glass. In other embodiments, copper not associated with a crystal are present in the copper glass.

The copper may be in the form of copper ions, which may be complexed with any suitable anions such as monoanions, polyanions, and combinations thereof. In some embodiments, the copper is present or entrapped in the copper glass as $Cu^{+2}$ ions. Where the copper ions are present or entrapped in the copper glass network or matrix, copper ions may be complexed with anions atomically bonded to the copper glass network or matrix.

The copper may be present on or in (or beneath) the surface and/or the bulk of the copper glass network or matrix. In certain embodiments, the copper is evenly dispersed throughout a network or matrix of glass. In other embodiments, the copper is unevenly dispersed throughout the copper glass network or matrix of the copper glass particle. For example, the copper may be present in a higher concentration toward or on the surface of the copper glass, or alternatively the copper may be present in a higher concentration toward the middle of the copper glass. In certain embodiments, the copper is dispersed throughout the copper glass in a direction gradient.

The copper glass may comprise copper (including any copper species) in any amount. Typically, the copper is present in the copper glass in an amount of from 5 to 35 weight percent based on the total weight of the copper glass. For example, the total amount of copper in the copper glass may be in a range of from about 10 to about 30, from about 15 to about 25, from about 11 to about 30, from about 12 to about 30, from about 13 to about 30, from about 14 to about 30, from about 15 to about 30, from about 16 to about 30, from about 17 to about 30, from about 18 to about 30, from about 19 to about 30, from about 20 to about 30, from about 10 to about 29, from about 10 to about 28, from about 10 to about 27, from about 10 to about 26, from about 10 to about 25, from about 10 to about 24, from about 10 to about 23, from about 10 to about 22, from about 10 to about 21, from about 10 to about 20, from about 16 to about 24, from about 17 to about 23, from about 18 to about 22, from about 19 to about 21, weight percent based on the total weight of the copper glass, or in any range or sub-range therebetween. The amount of copper may be determined by inductively coupled plasma (ICP) techniques known in the art.

In some embodiments, the copper glass may comprise a greater amount of $Cu^{1+}$ and/or CuO than $Cu^{2+}$. For example, based on the total amount of $Cu^{1+}$, $Cu^{2+}$ and CuO in the copper glass, the percentage of $Cu^{1+}$ and $Cu^{o}$, combined, may be in the range from about 50 to about 99.9, from about 50 to about 99, from about 50 to about 95, from about 50 to about 90, from about 55 to about 99.9, from about 60 to about 99.9, from about 65 to about 99.9, from about 70 to about 99.9, from about 75 to about 99.9, from about 80 to about 99.9, from about 85 to about 99.9, from about 90 to about 99.9, from about 95 to about 99.9, weight percent, based on the total weight of copper ions, or any range or sub-range therebetween. The relative amounts of $Cu^{1+}$, $Cu^{2+}$ and $Cu^{o}$ may be determined using x-ray photoluminescence spectroscopy (XPS) techniques known in the art.

In one or more embodiments, the copper glass may also comprise one or more colorants. Examples of such colorants include NiO, $TiO_2$, $Fe_2O_3$, $Co_3O_4$, and other known colorants. In some embodiments, the one or more colorants may be present in the copper glass in an amount up to about 10 weight percent based on the total weight of the copper glass. In some embodiments, the one or more colorants may be present in the copper glass in an amount in a range of from about 0.01 to about 10, from about 1 to about 10, from about 2 to about 10, from about 5 to about 10, from about 0.01 to about 8, or from about 0.01 to about 5, weight percent based on the total weight of the copper glass.

In one or more embodiments, the copper glass may exhibit a preservative function in the antimicrobial paint composition. In such embodiments, the antimicrobial glass may kill or eliminate, or reduce the growth of various foulants in the carrier vehicle. Foulants include microbes, such as fungi, bacteria, viruses and combinations thereof. In some embodiments the copper glass may only exhibit a preservative function in the antimicrobial paint composition when combined with the carrier vehicle.

When present in the antimicrobial paint composition and/or the antimicrobial coating formed therefrom, the copper glass leaches (i.e., releases, emits) copper. The copper release of the copper glass may be caused by contact between the copper glass and a leachate, such as water, where the leachate causes the copper to be released from the copper glass. In some embodiments, the copper glass leaches copper only when exposed to leachates, such as water. Additionally, the copper glass may have a tunable copper release. This action may be described in terms of solubility, and the solubility of the copper species in the copper glass can be tuned to control the release of the copper (e.g. increase or decrease in the presence of a particular leachate).

In some embodiments, where the copper is present or entrapped in the copper glass and forms atomic bonds with atoms in the copper glass, water or humidity may break those bonds making the copper available for release from the copper glass.

Non-Copper Pyrithione Salt

The antimicrobial paint composition also comprises a non-copper pyrithione salt. The term pyrithione is used to describe the chemical compound known by the names: 1-hydroxy-2-pyridinethione; 2-pyridinethiol-1-oxide; 2-pyridinethione; 2-mercaptopyridine-N-oxide; pyridinethione; and pyridinethione-N-oxide. Typically, the non-copper pyrithione salt comprises a pyrithione and a non-copper cation. Accordingly, in certain embodiments, the non-copper pyrithione salt has a structure corresponding to formula I:

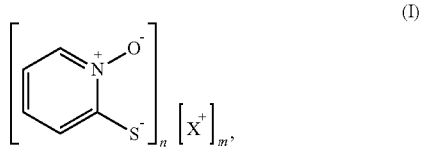

where X is a non-copper cation and subscripts n and m are selected such that the non-copper pyrithione salt is neutral. The term "non-copper pyrithione salt" is meant to include a molecule having a chemical structure represented by formula I, where X is not copper. Similarly, the term "non-copper cation" is meant to describe any suitable cation for use as X to the exclusion of copper. The non-copper cation may be an inorganic or an organic cation. Examples of inorganic cations include metals. The metal may be a polyvalent metal atom, a monovalent metal atom, or combinations thereof, which may also be independently selected. Examples of polyvalent metal atoms include zinc, tin, cadmium, bismuth, zirconium, magnesium, aluminum, and combinations thereof. Examples of monovalent metal atoms include lithium, sodium, potassium, and combinations thereof. Examples of organic cations include imidazoliums, pyridiniums, pyrrolidiniums, sulfoniums, phosphoniums, and ammoniums. As such, the non-copper pyrithione salt may be, for example, an imidazolium salt, a pyridinium salt, a pyrrolidinium salt, a sulfonium salt, a phosphonium salt, an ammonium salt, or combinations thereof. Specific examples of non-copper pyrithione salts may include the compounds described in U.S. Pat. Nos. 2,809,971; 2,786,847; 3,589,999; 3,590,035; and 3,773,770, which are herein incorporated by reference. In specific embodiments, the non-copper cation is zinc, sodium, or combinations thereof. In particular embodiments the non-copper cation is zinc. In further embodiments the non-copper cation is sodium.

In certain embodiments, the non-copper pyrithione salt further comprises non-pyrithione anions, such as nitrates, acetates, sulfates, halides, and the like, or combinations thereof. As such, the non-copper pyrithione salt may be, for example, a nitrate salt, an acetate salt, a sulfate salt, a halide salt, and the like, or combinations thereof.

The non-copper pyrithione salt may be present in the antimicrobial paint composition in any form, such as pyrithione particles described in U.S. Pat. Nos. 4,670,430 and 6,017,936, which are herein incorporated by reference. In some embodiments, the non-copper pyrithione salt is present in the antimicrobial paint composition in a non-agglomerated (i.e., not particulate) form.

The non-copper pyrithione salt may be present in the antimicrobial paint composition in any amount, such as from greater than 0 to about 2, alternatively from about 0.01 to about 1.75, alternatively from about 0.02 to about 1.5, alternatively from about 0.03 to about 1.25, alternatively from about 0.035 to about 1, alternatively from about 0.035 to about 0.75, alternatively from about 0.035 to about 0.5, alternatively from about 0.035 to about 0.25, alternatively from about 0.035 to about 0.2, alternatively from about 0.035 to about 0.18 weight percent based on the total weight of the antimicrobial paint composition.

The weight-to-weight (w/w) ratio of the copper glass to the non-copper pyrithione salt present in the antimicrobial paint composition may be selected to provide the antimicrobial paint composition, and/or the antimicrobial coating formed therefrom, with an improved antimicrobial efficacy, as described in further detail below. Typically, the non-copper pyrithione salt is present in the antimicrobial paint composition in an amount such that the ratio (w/w) of the copper glass to the non-copper pyrithione salt is from about 1:1 to about 55:1. For example, the ratio (w/w) of the copper glass to the non-copper pyrithione salt is from about 1:1 to about 53:1, alternatively about 1.5:1 to about 50:1, alternatively about 2:1 to about 45:1, alternatively about 2.5:1 to about 40:1; alternatively about 3:1 to about 35:1, alternatively about 4:1 to about 30:1, alternatively about 5:1 to about 25:1, alternatively about 6:1 to about 22:1, alternatively about 7:1 to about 21:1, alternatively about 8:1 to about 20:1, alternatively about 9:1 to about 20:1, alternatively about 1:1 to about 20:1, alternatively about 11:1 to about 20:1.

In some embodiments, the ratio (w/w) of the copper glass to the non-copper pyrithione salt is from greater than about 12:1 to about 30:1, such as from about 12.1:1 to about 20:1, alternatively about 12.1:1 to about 19.75:1, alternatively about 12.1:1 to about 19.5:1, alternatively about 12.1:1 to about 19.25:1, alternatively about 12.1:1 to about 19:1, alternatively about 12.1:1 to about 18.75:1, alternatively about 12.1:1 to about 18.5:1, alternatively about 12.1:1 to about 18.25:1, alternatively about 12.1:1 to about 17:1, alternatively about 12.1:1 to about 17.75:1, alternatively about 12.1:1 to about 17.5:1, alternatively about 12.1:1 to about 17.25:1, alternatively about 12.1:1 to about 16:1. In particular embodiments, the non-copper pyrithione salt is present in the antimicrobial paint composition in an amount such that the ratio (w/w) of the copper glass to the non-copper pyrithione salt is greater than about 12:1 to about 16:1, such as about 13.3:1.

Additional Components

In some embodiments the antimicrobial paint composition comprises additional components. Such additional components include, but are not limited to, colorants, elution additives, coalescing aids, surfactants, thickeners, rheology modifiers, defoamers, compatibilizers, and the like.

In certain embodiments, the antimicrobial paint composition further comprises one or more colorants, such as pigments, dyes, and the like. Such colorants can be organic or inorganic, synthetic or natural. Non-limiting examples of suitable pigments include cadmium yellow, cadmium red, cadmium green, cadmium orange, carbon black (including vine black, lamp black), ivory black (bone char), chrome yellow, chrome green, cobalt violet, cobalt blue, cerulean blue, aureolin (cobalt yellow), Azurite, Han purple, Han blue, Egyptian blue, Malachite, Paris green, Phthalocyanine Blue BN, Phthalocyanine Green G, verdigris, viridian, sanguine, caput mortuum, oxide red, red ochre, Venetian red, Prussian blue, yellow ochre, raw sienna, burnt sienna, raw umber, burnt umber, Cremnitz white, Naples yellow, vermilion titanium yellow, titanium beige, titanium white ($TiO_2$), titanium black, ultramarine, ultramarine green shade, zinc white, zinc ferrite, alizarin (synthesized or natural), alizarin crimson (synthesized or natural), gamboge, cochineal red, rose madder, indigo, Indian yellow, Tyrian purple, quinacridone, magenta, phthalo green, phthalo blue, pigment red 170, or any combinations thereof. In some embodiments, the antimicrobial paint composition includes a colorant comprising titanium dioxide ($TiO_2$).

In more than one embodiment, the antimicrobial paint composition comprises at least about 10 weight percent colorants based on the total weight of the antimicrobial paint composition. In some embodiments, the antimicrobial paint composition comprises colorants in an amount between from about 11 to about 30, such as about 11, 12, 13, 14, 15, 16, 17, 18, 19, 20, 21, 22, 23, 24, 25, 26, 27, 28, 29, or 30, weight percent based on the total weight of the antimicrobial paint composition. In some embodiments, the colorant comprises pigments and/or dyes that can be added to the antimicrobial paint composition, alone or in combination, to produce a wide range of colored paint.

In some embodiments the antimicrobial paint composition comprises functional fillers which are non-water soluble solids. The functional fillers may be, for example, reinforcing fillers and/or extending fillers. Such functional fillers may include solids which provide additional functional characteristics to the antimicrobial paint composition, for example, intumescent ingredients, such as ammonium polyphosphates, melamines, pentaerythritol and similar compounds. Example of suitable functional fillers may include calcium carbonate, talc, clay, silicates, aluminum silicates, calcium metasilicates, aluminum potassium silicates, magnesium silicates, barium sulfates, nepheline syenite, feldspar, zinc oxides or sulfides, or others known to those skilled in the art, and combinations thereof. The functional filler may be included in amounts up to about 30 weight percent, for example, from 10 to 20 weight percent based on the total weight of the antimicrobial paint composition. In certain embodiments, the functional fillers may be included in amounts up to about 15 weight percent, for example from about 1 to about 14, alternatively about 2 to about 13, alternatively about 3 to about 12 weight percent based on the total weight of the antimicrobial paint composition.

In one useful embodiment, the coating composition of the present invention is substantially free or totally free of intumescent ingredients such as ammonium polyphosphates, melamines, and pentaerythritol and similar compounds. In some embodiments, the antimicrobial paint composition includes a hiding pigment, such as ROPAQUE™, commercially available from the Dow Chemical Company of Midland, MI.

In particular embodiments, the antimicrobial paint composition further comprises a coalescing aid. Suitable coalescing aids include any compound that decreases the minimum film-formation temperature of the film-forming polymer, and/or increases the rate of solid film formation from the film-forming polymer when the carrier vehicle is removed. One example of suitable coalescing aids is the Eastman Optifilm™ coalescents available from Eastman Chemical Company. Other specific examples of suitable coalescing aids include the unsaturated ester coalescing aids described in U.S. patent application no. US2015/0240106, which is herein incorporated by reference. Other examples of suitable coalescing aids include glycol ethers, such as those available from the Dow Chemical Company under the trade name UCAR. The coalescing aid can further include one or more additional compounds that can aid in the coalescing of the film-forming polymers. Suitable additional compounds in the coalescing aid include, but are not limited to, 2,2,4-trimethyl-1,3-pentanediol isobutyrate, commercially available as TEXANOL from Eastman Chemical Company.

Any suitable amount of the coalescing aid can be used in the antimicrobial paint composition. The amount of the coalescing aid can vary depending on a variety of factors, including, but not limited to, the desired end use of the antimicrobial paint composition, the properties of the film-forming polymer, the identity of the component(s) of the coalescing aid, and the like. In certain embodiments, the antimicrobial paint composition comprises the coalescing aid in an amount of from about 0.1 to about 3, alternatively about 0.25 to about 2.5, alternatively about 0.5 to about 2, alternatively about 0.75 to about 2, alternatively about 0.75 to about 1.5, alternatively about 1 to about 1.5, alternatively about 1 to about 1.25, weight percent based on the entire weight of the antimicrobial paint composition. In some embodiments, the weight-to-weight ratio of film-forming polymer to coalescing aid ranges from 5:1 to 30:1, alternatively from 10:1 to 25:1, alternatively from 10:1 to 20:1, alternatively from 12:1 to 18:1, alternatively from 15:1 to 16:1. In some embodiments, the weight-to-weight ratio of water to coalescing aid ranges from 10:1 to 100:1, alternatively from 20:1 to 80:1, alternatively from 30:1 to 70:1, alternatively from 40:1 to 60:1, alternatively from 40:1 to 50:1. In embodiments where a co-solvent is used in addition to water in the carrier vehicle, the foregoing ratios may apply to the combination of components in the carrier vehicle, and not exclusively to the main component of the carrier vehicle (e.g. water).

In certain embodiments, the antimicrobial paint composition comprises a surfactant. The surfactant may be nonionic or ionic, such as cationic, anionic, or zwitterionic. In some embodiments, the surfactant is a mixture of one or more types of surfactants, such as a mixture of one or more anionic surfactants and one or more nonionic surfactants.

Specific examples of surfactants include alkoxylate, alcohol ethyoxylate, sulfosuccinate, sulfate, sulfonate, disulfonate, phosphate ester, phenolic, or ethylene oxide/propylene oxide surfactants, or combinations thereof. Particular examples of surfactants include ECOSURF™, TERGITOL™, DOW-FAX™, and TRITON surfactants available from the Dow Chemical Company, Dynol™ surfactants available from Air Products Chemicals, Strodex® surfactants available from Ashland, ABEX® surfactants available from Solvay, and the like.

Any suitable amount of the surfactant can be used in the antimicrobial paint composition. The amount of the surfactant can vary depending on a variety of factors, including, but not limited to, the desired end use of the antimicrobial paint composition, the properties of the film-forming polymer, the identity of the component(s) of the surfactant, and the like. In certain embodiments, the antimicrobial paint composition comprises the surfactant in an amount of from about 0.1 to about 2, alternatively about 0.2 to about 1.5, alternatively about 0.25 to about 1, alternatively about 0.25 to about 0.75, alternatively about 0.25 to about 0.5, weight percent based on the entire weight of the antimicrobial paint composition.

In particular embodiments, thickeners and/or rheology modifiers may also be added to the antimicrobial paint composition to achieve the desired viscosity and flow properties. Thickeners function by, for example, forming multiple hydrogen bonds with the acrylic polymers, thereby causing chain entanglement, looping and/or swelling which results in volume restriction. In certain embodiments, thickeners such as cellulose derivatives including hydroxyethyl cellulose, methyl cellulose and carboxymethyl cellulose, may be used in the antimicrobial paint composition. Other examples of suitable thickeners include the RHEOLATE® thickeners available from Elementis Specialties. In some embodiments, the antimicrobial paint composition includes a rheology modifier. Specific examples of suitable rheology modifiers include AQUAFLOW rheology modifiers from Ashland, Inc. In certain embodiments, the antimicrobial paint composition has a viscosity of from about 70 to about 130, alternatively from about 75 to about 115, alternatively from about 80 to about 120, alternatively from about 85 to about 115 KU. In some embodiments, the antimicrobial paint composition has a viscosity of about 70, 75, 80, 85, 90, 95, 100, 105, 110, 115, 120, 125, or 130 KU.

Any suitable amount of the thickeners and/or rheology modifiers can be used in the antimicrobial paint composition. The amount of the thickeners and/or rheology modifiers can vary depending on a variety of factors, including, but not limited to, the desired end use of the antimicrobial paint composition, the properties of the film-forming polymer, the identity of the component(s) of the thickeners and/or rheology modifiers, and the like. In certain embodiments, the antimicrobial paint composition comprises the thickeners and/or rheology modifiers in an amount of from about 0.05 to about 3, alternatively about 0.075 to about 2.5, alternatively about 0.1 to about 2, alternatively about 0.25 to about 1.5, alternatively about 0.5 to about 1.25, alternatively about 0.5 to about 1, alternatively about 0.6 to about 1, weight percent based on the entire weight of the antimicrobial paint composition.

In some embodiments, the antimicrobial paint composition includes a defoamer. The defoamer may be any suitable chemical additive that reduces and hinders the formation of foam in the antimicrobial paint composition. Specific examples of suitable defoamers include the BYK® defoamers available from the Atlana group, and DREWPLUS foam controllers available from Ashland, Inc. Any suitable amount of the defoamer can be used in the antimicrobial paint composition. In certain embodiments, the antimicrobial paint composition comprises the defoamer in an amount of from about 0.01 to about 1, alternatively about 0.03 to about 0.9, alternatively about 0.05 to about 0.75, alternatively about 0.06 to about 0.6, weight percent based on the entire weight of the antimicrobial paint composition.

In certain embodiments, the antimicrobial paint composition comprises solids. The solids may be thickeners, pigments, and the like. Suitable examples of solids include attapulgite, such as ATTAGEL® available from BASF. The solids may be present in the antimicrobial paint composition in an amount of from 0.01 to 5 weight percent based on the total weight of the antimicrobial paint composition. In certain embodiments, the antimicrobial paint composition comprises solids in an amount of from 0.3 to 5, alternatively from 0.5 to 4.5, alternatively from 0.6 to 4, alternatively from 0.7 to 3.5, alternatively from 0.6 to 3, alternatively from 0.5 to 2.5, alternatively from 0.8 to 2, alternatively from 0.8 to 1.2 weight percent based on the total weight of the antimicrobial paint composition. In particular embodiments, the antimicrobial paint composition comprises solids in an amount of from 0.3 to 1.2, such as from 0.43, weight percent based on the total weight of the antimicrobial paint composition. In other embodiments the antimicrobial paint composition comprises solids in an amount of about 0.3, 0.4, 0.43, 0.5, 0.6, 0.7, 0.8, 0.9, 1, 1.1, 1.2, 1.3, 1.4, 1.5, 1.6, 1.7, 1.8, 1.9, or 2 weight percent based on the total weight of the antimicrobial paint composition.

In particular embodiments, the antimicrobial paint composition contains preservatives, such as fungistats, biocides, and the like. Specific examples of suitable preservatives include Polyphase® fungistats available from the Troy Corporation, and Proxel® biocides available from the Lonza Group.

In some embodiments, the copper and the non-copper pyrithione salt interact in the antimicrobial paint composition (i.e., in situ) to form copper pyrithione. Without wishing to be bound by any particular theory, it is believed that, in general, the copper leaches from the copper glass and interacts with the non-copper pyrithione salt to form copper pyrithione. Additionally, the copper present or entrapped in the copper glass, without leaching therefrom, may also interact with the non-copper pyrithione salt to form copper pyrithione. Accordingly, it is also believed that the rate copper release from the copper glass will influence the rate of copper pyrithione formation in the antimicrobial paint composition. For example, an increase in the rate of copper release from the copper glass may increase the rate of interaction of the copper and non-copper pyrithione salt.

In specific embodiments, the copper and the non-copper pyrithione salt interact in the antimicrobial coating formed from the antimicrobial paint composition, such as by methods described in further detail below, may also or alternatively interact to form copper pyrithione in the antimicrobial coating. For example, the antimicrobial coating may be formed from the antimicrobial paint composition that comprises copper pyrithione formed by the interaction of the copper and the non-copper pyrithione salt in the antimicrobial paint composition. In such embodiments, the copper and the non-copper pyrithione salt in the may also interact in the antimicrobial coating to form copper pyrithione in the antimicrobial coating. In other embodiments, the antimicrobial coating may be formed from the antimicrobial paint composition that is substantially free of copper pyrithione. In such other embodiments, the copper and the non-copper pyrithione salt will interact in or on the antimicrobial coating to form copper pyrithione in and/or on the antimicrobial coating.

As introduced above, the ratio (w/w) of the copper glass to the non-copper pyrithione salt present in the antimicrobial paint composition may be selected to provide the antimicrobial paint composition, and/or the antimicrobial coating formed therefrom, with an improved antimicrobial efficacy. While note inclusive, particular examples, properties, and measurements of efficacy are described further below. However, it is to be appreciated that any measure, test, and/or process may be used to characterize the efficacy of the antimicrobial paint composition and/or the antimicrobial coating formed therefrom. Without wishing to be bound by any particular theory, it is believed that the ratio of copper glass, and thus the copper present or entrapped in the copper glass, to the non-copper pyrithione salt impacts the formation and localized and general concentrations of copper pyrithione in the antimicrobial paint composition, and/or the antimicrobial coating formed therefrom. It is also believed that particular ratios of the copper to the non-copper pyrithione salt, such as those described herein, impart an unexpected increase in the antimicrobial efficacy of the antimicrobial paint composition and/or the antimicrobial coating therefrom. As such, the antimicrobial paint composition and/or the antimicrobial coating formed therefrom represents a significant improvement over the prior art.

Moreover, the antimicrobial paint composition, and/or the antimicrobial coating formed therefrom, may exhibit other superior properties and/or possess superior characteristics to previous paint compositions and/or coatings formed therefrom, and may have numerous excellent and characterizing properties. For example, the antimicrobial paint composition may have improved and/or excellent ease of application, flow, film-formation, corrosion resistance, water resistance, heat resistance, flexibility, durability, adhesion, abrasion resistance, scratch resistance, color, color stability, and combinations thereof. In some embodiments, the antimicrobial paint composition may have improved and/or high opacity, quick drying times, and combinations thereof. In these or other embodiments, the coating formed from the antimicrobial paint composition may have improved and/or easy cleanability, Additionally, in some embodiments, the antimicrobial paint composition is an environmentally friendly composition, for example, that contains a low content of volatile organic components (VOCs). In some embodiments, the antimicrobial paint composition includes no more than 10, or no more than 5, or no more than 3, or no more than 1 g/L, of VOCs, as measured by ASTM D6886-14.

The method of preparing the antimicrobial paint composition comprises a step of combining the carrier vehicle, the film-forming polymer, the glass comprising copper, and the non-copper pyrithione salt. The carrier vehicle, film-forming polymer, glass comprising copper, and non-copper pyrithione salt may be combined individually or in combinations, sequentially or simultaneously, or combinations thereof. Additionally, the step of combining may be performed by manual or automated processes, or combinations thereof. The step of combining may also be performed by any means suitable for introducing two or more components together, such as mixing, blending, stirring, and the like, and combinations thereof. In certain embodiments, the antimicrobial paint composition is prepared by combining a grind base comprising the glass comprising copper and the non-copper pyrithione salt with a let-down composition comprising the carrier vehicle and the film-forming polymer. In other embodiments, the antimicrobial paint composition is prepared by combining a grind base comprising the glass comprising copper with a let-down composition comprising the carrier vehicle, the film-forming polymer, and the non-copper pyrithione salt. In some such embodiments, the grind base and/or the let-down composition may comprise any combination of the additional components described above.

In some embodiments, the step of combining the carrier vehicle, the film-forming polymer, the glass comprising copper, and the non-copper pyrithione salt is performed by mixing, such as batch mixing, continuous mixing, motionless mixing, diffusion mixing, laminar mixing, solid deagglomeration, and the like, and combinations thereof.

In some embodiments, the step of combining the carrier vehicle, the film-forming polymer, the glass comprising copper, and the non-copper pyrithione salt is performed by blending, such as diffusion blending, convection blending, shear blending, single-phase blending, multi-phase blending.

In specific embodiments, the step of combining the carrier vehicle, the film-forming polymer, the glass comprising copper, and the non-copper pyrithione salt is performed by at least one of mixing, blending, and stirring.

The step of combining the carrier vehicle, the film-forming polymer, the glass comprising copper, and the non-copper pyrithione salt may also be performed at any temperature. In specific embodiments, the step of combining is performed at ambient temperature. The term "ambient temperature" and is the temperature and pressure of a location where the step of combining is performed. In other embodiments, the step of combining may be performed above or below ambient temperature, such as by incorporating heaters or coolers to warm or cool any component being combined in the step of combining.

The step of combining the carrier vehicle, the film-forming polymer, the glass comprising copper, and the non-copper pyrithione salt may also be performed at any pressure. In certain embodiments, the step of combining is performed at ambient (i.e., atmospheric) pressure. In other embodiments, the step of combining is performed at elevated pressure, such as by pressurizing a location where the step of combining is performed.

In specific embodiments, the step of combining is performed at ambient temperature and pressure.

The method of preparing the antimicrobial coating on an indoor surface with the antimicrobial paint composition comprises a step of applying the antimicrobial paint composition on the indoor surface.

The step of applying the antimicrobial paint composition on the indoor surface may be performed by any suitable technique for applying a composition to a surface, such as spraying, coating, and the like, and combinations thereof.

In some embodiments, the step of applying the antimicrobial paint composition on the indoor surface is performed by spraying, such as air spraying, airless spraying, electrostatic spraying, rotary atomizing, and the like.

In some embodiments, the step of applying the antimicrobial paint composition on the indoor surface is performed by coating such as brush coating, powder coating, roll coating, dip coating, flow coating, curtain coating, electrocoating, and the like.

The method of preparing the antimicrobial coating on an indoor surface with the antimicrobial paint composition also comprises a step of forming the antimicrobial coating on the indoor surface from the antimicrobial paint composition.

The step of forming the antimicrobial coating on the indoor surface from the antimicrobial paint composition may be performed by any technique of forming a coating from a paint composition. Typically, the step of forming the antimicrobial coating on the indoor surface from the antimicrobial paint composition is performed by removing the carrier vehicle from the antimicrobial paint composition on the indoor surface. For example, in specific embodiments, the carrier vehicle may be removed from the antimicrobial paint composition by a process such as by drying, flashing, hardening, and the like, or combinations thereof.

The step of forming the antimicrobial coating on the indoor surface from the antimicrobial paint composition may be performed at any temperature. In certain embodiments, the step of forming is performed at ambient temperature. In other embodiments, the step of forming is performed at elevated temperature, i.e., a temperature greater than an ambient temperature of a location where the step of forming is performed.

The antimicrobial coating may be prepared on an indoor surface of any composition suitable for painting, such as wood, concrete, drywall, plaster, brick, stone, metal, plastic, or resin. The antimicrobial coating may also be prepared on an indoor surface coated with materials such as paints, primers, and the like.

The indoor surface may be located in any kind of interior location, such as in a building including residences, hospitals, factories, hotels, and the like. Other examples of suitable interior locations include vehicles such as cars, ambulances, buses, trains, airplanes, boats and ships, and the like. Examples of suitable indoor surfaces for coating with the antimicrobial paint composition include ceilings, walls, floors, counters, fixtures, basins, pieces of furniture or machinery, and the like. Likewise, examples of suitable indoor surfaces also include pipes, drains, storage tanks, and valves. In certain embodiments, the indoor surface is a surface on a moveable object that can be transported to and/or from an interior location.

Notably, the foregoing method may also be utilized on exterior or outdoor surfaces in the same manner as on indoor surfaces.

The antimicrobial efficacy of the antimicrobial paint composition and coatings formed therefrom can be defined in terms of a reduction in the total number of living microbes in contact with the antimicrobial paint composition or coatings. Alternatively, the efficacy may be defined as the reduction in the number of a specific type of microbe in contact with the antimicrobial paint composition or coatings. Examples of specific types of microbes include fungi, algae, bacteria, and viruses. Examples of fungi include *Aspergillus niger*, *Penicillium funiculosum*, and *Aureobasdium pullulans*. Examples of bacteria include *Bacillus subtilis*, *Salmonella choleraesius*, *Staphylococcus aureus*, *Escherichia coli*, *Enterobacter aerogenes*, *Mycobacterium smegmatis*, *Pseudomonas aeruginosa*, *Alcaligenes faecalis*, *Trichophyton mentagrophytes*, *Penicillium pinophilum*, and the like.

The antimicrobial paint composition and coatings formed therefrom may also be effective against disease-causing prions, such as those responsible for so-called mad cow disease. The prions responsible for this disease are specific proteins which occur in specific conformations. While not wishing to be bound by any specific theory, it is believed that interaction of such proteins with the antimicrobial paint composition and coatings can result in denaturation of the proteins with a change in their conformation, rendering them innocuous.

The antimicrobial efficacy of the antimicrobial paint composition and coatings formed therefrom can be measured in a variety of ways. For example, ASTM E 2180-01 is a standard, quantitative method that can be used to evaluate the antibacterial efficacy of the antimicrobial paint composition and coatings formed therefrom on hydrophobic or hard surfaces. In the ASTM method, a test surface is created by applying the antimicrobial paint composition to a surface, and then forming an antimicrobial coating on the surface from the antimicrobial paint composition. A bacterial suspension is then made in an agar slurry and applied onto the test surface to form a pseudo-biofilm with uniform, intimate contact with the test surface. The antibacterial effectiveness is determined by the percent reduction of bacteria from treated versus untreated samples. In certain embodiments, the antimicrobial efficacy of the antimicrobial paint composition and coatings formed therefrom is measures according to JIS Z2801.

The antimicrobial paint composition and/or coatings formed therefrom may have one or more of the following qualities: excellent application and appearance, excellent stability, and excellent durability. Excellent application and appearance refers to one or more of the following properties: flow and leveling, color uniformity, durability of tinted coating to shear, contrast ratio, tint strength, and applied hide. Excellent durability refers to one or more of the following properties: abrasive scrub resistance as measured by ASTM Test Method D 2486-74A (>400 scrubs), block resistance measured by ASTM-D 4946-89, (>6 after 1 day and 7 days), and adhesion measured by ASTM-D3359 Test Method A (greater than 3A). In some embodiments, coatings formed from the antimicrobial paint composition have a high resistance to fungal defacement when measured by ASTM Test Method D5590.

In some embodiments, the antimicrobial coating has a gloss of from about 1 to about 99 gloss units as measured by ASTM C346, ASTM D523, ASTM C584, or ASTM D2457, at 20°, 60°, or 85°. For example, the antimicrobial coating may have a Gloss at 60° of about 1, 5, 10, 15, 20, 25, 30, 35, 40, 45, 50, 55, 60, 65, 70, 75, 80, 85, 90, 95, or 99 gloss units.

EXAMPLE

The following examples are intended to illustrate the present invention and are not to be viewed in any way as limiting to the scope of the present invention.

Example 1

An antimicrobial paint composition is prepared in accordance with the present invention. The components and amounts thereof utilized to prepare the antimicrobial paint composition are set forth below in Table 1.

TABLE 1

| Component | Wt. % |
|---|---|
| Carrier Vehicle | 16.67* |
| Film-Forming Polymer | 41.59 |
| Glass comprising Copper | 0.76 |
| Non-Copper Pyrithione Salt | 0.19 |
| Solids 1 | 29.64 |
| Solids 2 | 0.43 |
| Defoamer 1 | 0.19 |
| Defoamer 2 | 0.10 |
| Surfactant 1 | 0.67 |
| Surfactant 2 | 0.38 |
| Coalescing Aid | 1.34 |
| Pigment | 3.82 |
| Fungicide | 0.29 |

TABLE 1-continued

| Component | Wt. % |
|---|---|
| Biocide | 0.29 |
| Rheology Modifier 1 | 0.38 |
| Rheology Modifier 2 | 2.87 |
| pH Modifier | 0.38 |

Carrier Vehicle is water.
Film-Forming Polymer is a 100% acrylic latex resin.
Glass comprising Copper is a copper-glass composite.
Non-Copper Pyrithione Salt is Zinc Omadine.
Solids 1 is a $TiO_2$-based slurry.
Solids 2 is an inert gelling grade attapulgite.
Defoamer 1 is a non-ionic liquid foam control agent.
Defoamer 2 is silicone-containing polyglycol defoamer.
Surfactant 1 is a sodium salt of an anionic maleic anhydride/acid copolymer.
Surfactant 2 is a fatty alcohol ether-based non-ionic surfactant.
Coalescing Aid is a low-odor latex paint coalescent.
Pigment is a styrene acrylic latex-based hollow-sphere organic pigment.
Fungicide is a methyl 2-benzimidazole carbamate-based dry-film preservative.
Biocide a 1,2-benzisothiazolin-3-one-based biocide.
Rheology Modifier 1 is a low-shear non-ionic associative thickener.
Rheology Modifier 2 is a high-shear synthetic effective low VOC, nonionic synthetic associative thickener.
pH Modifier is 25% Sodium Hydroxide.
It is to be appreciated that the amount of the carrier vehicle listed in Table 1 is limited to the amount of water added to the antimicrobial paint composition of Example 1 as a specific component, and does not include the amounts of the carrier vehicle present within the other components listed in Table 1. In particular, the antimicrobial paint composition of Example 1 comprises approximately 63 wt. % of the carrier vehicle, which is water.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. An antimicrobial paint composition for forming an antimicrobial coating, said antimicrobial paint composition comprising:
   a carrier vehicle;
   a film-forming polymer;
   a glass comprising copper;
   a non-copper pyrithione salt; and
   titanium dioxide ($TiO_2$) as a colorant;
   wherein said copper and said pyrithione salt interact to form copper pyrithione in the antimicrobial paint composition and/or the antimicrobial coating formed thereby;
   wherein the glass comprising copper is present in an amount of from about 0.08 to about 2.0 weight percent based on the total weight of the antimicrobial paint composition;
   wherein the titanium dioxide ($TiO_2$) is present in an amount of from 11 to 30 weight percent based on the total weight of the antimicrobial paint composition; and
   wherein the glass comprising copper and the non-copper pyrithione are present in a weight-to-weight ratio of from greater than about 12:1 to about 20:1.

2. The antimicrobial paint composition of claim 1, wherein the film-forming polymer comprises an organic film-forming polymer having an average particle size of from about 80 to about 160 nm.

3. The antimicrobial paint composition of claim 1, wherein the film-forming polymer is selected from the group consisting of acrylics, polyurethane dispersions, silicone emulsions, solution polymers, styrene acrylate dispersions, urethane-acrylic hybrid dispersions, aliphatic polyurethane dispersions, acrylic dispersions, and combinations thereof.

4. The antimicrobial paint composition of claim 3, wherein the organic film-forming polymer comprises an acrylic resin.

5. The antimicrobial paint composition of claim 1, further comprising a pigment.

6. The antimicrobial paint composition of claim 1, comprising from about 0.1 to about 5 weight percent solids.

7. The antimicrobial paint composition of claim 1, wherein the glass comprising copper is in the form of particles having an average particle size of from about 0.05 to about 20 micrometers.

8. The antimicrobial paint composition of claim 1, wherein the glass comprising copper is a silicate glass.

9. The antimicrobial paint composition of claim 1, wherein the copper of the glass comprising copper comprises $Cu^{+2}$ ions.

10. The antimicrobial paint composition of claim 1, wherein the non-copper pyrithione salt comprises a polyvalent metal atom.

11. The antimicrobial paint composition of claim 10, wherein the polyvalent metal atom is zinc, tin, cadmium, bismuth, zirconium, magnesium, aluminum, or combinations thereof.

12. The antimicrobial paint composition of claim 1, wherein the non-copper pyrithione salt comprises a monovalent metal atom.

13. The antimicrobial paint composition of claim 12, wherein the monovalent metal atom is lithium, sodium, potassium, or combinations thereof.

14. The antimicrobial paint composition of claim 1, wherein the non-copper pyrithione salt is an imidazolium salt, a pyridinium salt, a pyrrolidinium salt, a sulfonium salt, a phosphonium salt, an ammonium salt, or combinations thereof.

15. The antimicrobial paint composition of claim 1, wherein the paint composition further comprises an elution additive to increase the copper elution rate of the copper glass.

16. The antimicrobial paint composition of claim 1, wherein the film-forming polymer and the carrier vehicle are present in a weight-to-weight ratio of from about 1:2 to about 10:1.

17. A method of preparing the antimicrobial paint composition of claim 1, said method comprising:
combining: the carrier vehicle, the film-forming polymer, the glass comprising copper; the non-copper pyrithione salt; and the titanium dioxide to give the antimicrobial paint composition.

18. A method of preparing an antimicrobial coating on an indoor surface with an antimicrobial paint composition, said method comprising the steps of:
applying the antimicrobial paint composition of claim 1 on the indoor surface; and
forming the antimicrobial coating on the indoor surface from the antimicrobial paint composition.

* * * * *